Jan. 7, 1969  B. SPEIDEL ET AL  3,420,106
MANOMETER
Filed April 4, 1967
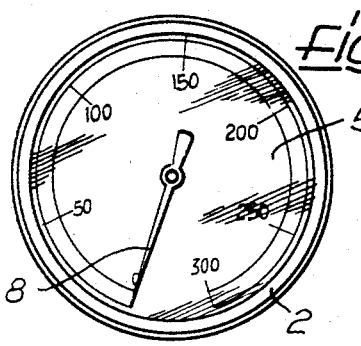
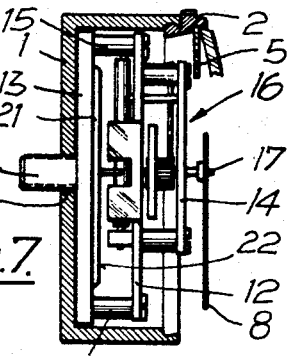
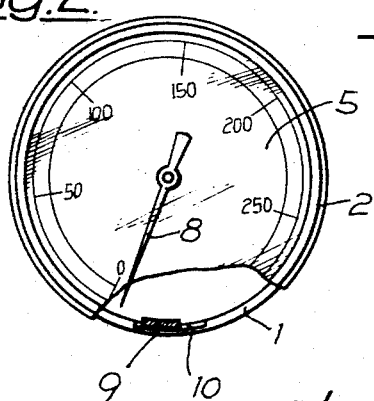
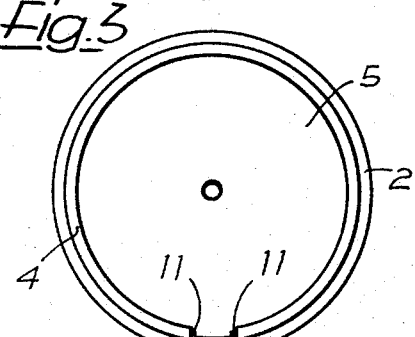
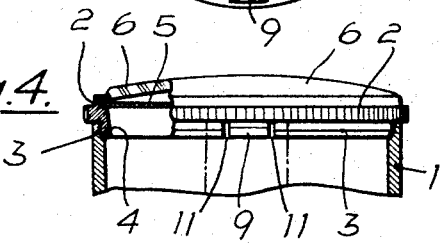
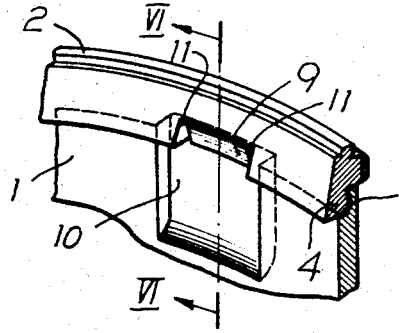
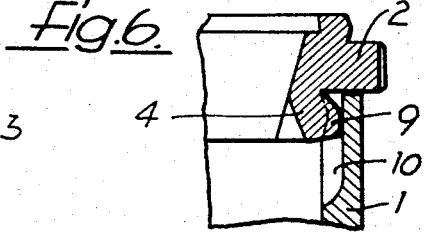
Inventor:

United States Patent Office 3,420,106
Patented Jan. 7, 1969

3,420,106
MANOMETER
Blasius Speidel, 244 Hochmeisterstrasse, and Paul Keller, 288 Weilbachstrasse, both of 7455 Jungingen, Germany
Filed Apr. 4, 1967, Ser. No. 628,332
Claims priority, application Germany, Apr. 7, 1966, S 103,109
U.S. Cl. 73—393      2 Claims
Int. Cl. G01l 19/04

ABSTRACT OF THE DISCLOSURE

The improvement in a manometer for permitting it to be adjusted in accordance with temperature variations by designing the dial ring so as to permit it to be turned to an extent corresponding to the possible deviations of the pointer from the zero point of the dial due to temperature variations.

Background of the invention

The present invention relates to a manometer and especially a sphygmomanometer, and more particularly to a device for adjusting the manometer by providing it with a dial ring which is rotatably mounted on the lower part of the manometer so as to permit it to be turned in its peripheral direction. In the known manometers of this type, the ring surrounding the dial is rotatably mounted on the lower part of the manometer so as to permit the zero point of the dial ring to be adjusted in relation to the pointer when at rest in its inactive position, that is, when the pointer finally deviates in this position from the zero point of the dial. These known manometers have, however, the disadvantage that the zero point of the dial may also be adjusted in accordance with the position of the pointer which has finally deviated from the zero point when due to overloading of the manometer by a relatively high pressure and a resulting permanent deformation of the pressure cell, the pointer did not return to its original position. An adjustment of the manometer is, however, in such a case of very little practical value since due to the permanent deformation of the pressure cell, the characteristic of this cell has been changed and no longer corresponds with the graduation of the dial.

Summary of the invention

It is an object of the present invention to prevent such erroneous adjustments of a manometer and to permit it to be adjusted only to compensate for temperature variations since such variations generally do not result in a considerable permanent deformation of the pressure cell.

This object is attained according to the invention by designing the manometer so as to permit the dial ring to be rotatable to a limited extent relative to the lower part of the manometer, namely, to the extent of the range within which the pointer may deviate from the zero point of the dial ring as the result of temperature variations, whereas larger deviations of the pointer from the zero point which are due to a considerable permanent deformation of the pressure cell should lie outside of the limited range of rotation of the dial ring.

In particular, the manometer according to the invention may for this purpose be provided with a projection on the outer peripheral surface of that part of the dial ring which is movable within the lower part of the manometer, and with a recess in the inner peripheral surface of this lower part into which the projection engages and within which it is slidable in the peripheral direction. This recess should be made of a length in the peripheral direction in accordance with the largest possible deviation of the pointer from the zero position of the dial which may be caused only by temperature variations.

The projection on the dial ring may be formed by providing a pair of substantially radial cuts in a collar of the dial ring which is to be inserted into the open end of the lower housing part of the manometer, and by bending the tab which is formed between these cuts in the outward direction.

If, therefore, due to considerable temperature variations the pointer deviates from the zero point of the dial, the dial ring may be turned to a limited extent so as to move the zero point of the dial to a position directly underneath the pointer.

The features and advantages of the present invention will become further apparent from the following detailed description thereof which is to be read with reference to the accompanying drawings, in which:

FIGURE 1 shows a front view of the manometer;

FIGURE 2 shows, partly broken away and in section, a front view of the manometer in which the pointer has returned to a position which does not accurately coincide with the zero position of the dial;

FIGURE 3 shows a view of the ring which carries the dial and is adjustable on the lower part of the manometer housing, as seen from the inside of the manometer;

FIGURE 4 shows an axial cross section of the lower part of the manometer housing and the dial ring which is shown only partly in section;

FIGURE 5 shows an enlarged perspective view of a segment of the manometer housing, as seen from the position of the shaft carrying the pointer;

FIGURE 6 shows a cross section which is taken along the line VI—VI of FIGURE 5; while FIGURE 7 shows a diagonal section of the lower housing part of the manometer and a side view of the manometer elements contained within this lower part.

As illustrated in the drawings, the manometer according to the invention comprises a housing with a cup-shaped lower part 1 and a dial ring 2 which is rotatably mounted on this lower part. The lower part of the dial ring 2 engages into the lower part 1 of the housing and is secured from falling off the lower part 1 by being provided with a small rib 3 on the outer side of a collar 4 of dial ring 2 which engages into a groove in the upper end portion of the lower housing part 1. In place of the rib 3, it is also possible to bead the collar 4 over the upper edge of the lower housing part 1. The dial ring 2 is adapted to be pressed partly into the lower housing part 1 and may be turned after the rib 3 has snapped into the groove in the lower housing part 1.

The dial ring 2 is provided in the usual manner with a dial 5 on which a graduated scale is printed, and above this dial with a cover glass 6, as shown particularly in FIGURE 4. For manipulating the dial ring 2 more easily, its outer peripheral surface is knurled.

In the lower housing part 1 of the manometer a base plate 13 is mounted on which a cap-shaped part 21 and studs 15 are secured. Base plate 13 together with the cap-shaped part which is tightly secured thereto form the deformable pressure cell 21, the main wall surface of which is corrugated in a conventional manner. Studs 15 carry a plate 12 which, in turn, carries a second plate 14 by means of further studs 15. These plates 12 and 14 carry the usual means 16 which do not need to be described in detail and serve for the purpose of transmitting the movements of the main surface 22 of the pressure cell 21, which are produced by the internal air pressure in this cell, to a pointer 8 the shaft of which is rotatably mounted in plates 12 and 14. The transmitting means 16 may also be designed as described and illustrated in our copending application Ser. No. 628,347, filed on the same date as the present application. The pressure cell 21 is provided with a nipple 7 which is inserted through a hole 18 in the bottom of the lower housing part 1 and upon the outer part of which a flexible tube may be attached.

According to the present invention, the dial ring 2 may be turned only for a certain distance relative to the lower housing part 1 by providing the outer peripheral surface of the collar 4 of the dial ring 2 with a projection, for example, in the form of a projection 9, which is adapted to engage into a recess 10 in the upper end of the inner wall of the lower housing part 1 and to be slidable therein in the peripheral direction. In the particular embodiment of the invention as illustrated, this projection 9 is formed by a tab which is produced by making a pair of cuts 11 in the collar 4 and by bending the piece intermediate these cuts in the outward direction.

This permits the dial ring 2 to be turned only for a distance which corresponds to the moveability of tab 9 within the recess 10 and to the range of the deviations of the pointer 8 from the zero point which may be caused by variations in temperature. This moveability of the dial ring 2 does, however, not permit an adjustment thereof after the pressure cell has been permanently deformed due to an excessive internal pressure which may cause a large deviation of the pointer from the indicated pressure values on the dial 5.

Although our invention has been illustrated and described with reference to the preferred embodiment thereof, we wish to have it understood that it is in no way limited to the details of such embodiment but is capable of numerous modifications within the scope of the appended claims.

Having thus fully disclosed our invention, what we claim is:

1. In a manometer, comprising a housing having a cup-shaped lower part and a dial ring having a graduated dial mounted on said lower part so as to be rotatable in the peripheral direction and secured from falling off the lower part, a pressure cell mounted within said lower part, a pointer adapted to sweep over said dial, said pointer angularly deviating from the zero point of said dial due to variations in ambient temperature, and means for transmitting the movements of a wall of said pressure cell to said pointer, the improvement comprising means for limiting the extent of the rotation of said dial ring, said means comprising a projection on the outer peripheral surface of the part of said dial ring which is movable within said lower housing part, and a recess in the inner peripheral surface of said lower housing part into which said projection engages and within which it is slidable in the peripheral direction, said recess subtending an angle of the order of the largest possible angular deviation of said pointer from the zero point of said dial caused by variations in the ambient temperature.

2. The improvement in a manometer as defined in claim 1, wherein said dial ring has a collar, and said projection is formed by a pair of substantially radial cuts in said collar and by bending the part of said collar between said cuts in the outward direction.

References Cited

UNITED STATES PATENTS

| | | | |
|---|---|---|---|
| 2,630,796 | 3/1953 | Eksten | 73—410 |
| 3,162,173 | 12/1964 | Morgan | 116—129 |

LOUIS R. PRINCE, *Primary Examiner.*

D. E. CORR, *Assistant Examiner.*

U.S. Cl. X.R.

73—387, 410, 431